(12) United States Patent
Ho et al.

(10) Patent No.: US 8,018,643 B2
(45) Date of Patent: *Sep. 13, 2011

(54) MAGNETOPHORETIC AND ELECTROMAGNETOPHORETIC DISPLAYS

(75) Inventors: Ching-Shon Ho, Atherton, CA (US); Jerry Chung, Mountain View, CA (US); Paul Gendler, San Jose, CA (US); Rong-Chang Liang, Cupertino, CA (US); HongMei Zang, Sunnyvale, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/509,201

(22) Filed: Jul. 24, 2009
(Under 37 CFR 1.47)

(65) Prior Publication Data
US 2010/0079850 A1   Apr. 1, 2010

Related U.S. Application Data

(63) Continuation of application No. 11/510,285, filed on Aug. 24, 2006, now Pat. No. 7,580,180, which is a continuation-in-part of application No. 11/149,678, filed on Jun. 8, 2005, now Pat. No. 7,113,323, which is a continuation-in-part of application No. 10/394,488, filed on Mar. 20, 2003, now Pat. No. 6,927,892.

(60) Provisional application No. 60/367,325, filed on Mar. 21, 2002.

(51) Int. Cl.
*G02B 26/00* (2006.01)
*G09G 3/34* (2006.01)

(52) U.S. Cl. ........................................ 359/296; 345/107

(58) Field of Classification Search .................. 359/296; 345/107; 430/32; 204/600
See application file for complete search history.

(56) References Cited

U.S. PATENT DOCUMENTS

| 3,670,323 A | 6/1972 | Sobel et al. |
| 4,002,804 A | 1/1977 | Akashi et al. |
| 4,126,854 A | 11/1978 | Sheridon |

(Continued)

FOREIGN PATENT DOCUMENTS

CN   1241265 A   1/2000

(Continued)

OTHER PUBLICATIONS

Allen, K. (Oct. 2003). Electrophoretics Fulfilled. *Emerging Displays Review: Emerging Display Technologies, Monthly Report—Octomber 2003*, 9-14.

(Continued)

*Primary Examiner* — William C Choi
(74) *Attorney, Agent, or Firm* — Perkins Coie LLP

(57) ABSTRACT

The present invention is directed to a display device which comprises two layers of insulating substrate, at least the substrate on the viewing side is transparent, an array of display cells sandwiched between the two layers of substrate, a writing means, and optionally an erasing means to magnetically or electrically erase the image. The display cells are filled with a dispersion of magnetic particles which may be charged or non-charged. The display of the invention eliminates the use of the transparent conductor film, such as ITO, on the viewing side. Therefore, the displays of this invention are more cost effective, more flexible and durable and capable of higher image contrast ratio and higher reflectance in the Dmin area.

18 Claims, 3 Drawing Sheets

U.S. PATENT DOCUMENTS

| | | | |
|---|---|---|---|
| 4,143,472 A | 3/1979 | Murata et al. | |
| 4,552,928 A | 11/1985 | Bauld et al. | |
| 4,594,400 A | 6/1986 | Kvita et al. | |
| 4,631,328 A | 12/1986 | Ringsdorf et al. | |
| 4,769,443 A | 9/1988 | Cantaore | |
| 5,272,238 A | 12/1993 | Garnier et al. | |
| 5,930,026 A | 7/1999 | Jacobson et al. | |
| 5,961,804 A | 10/1999 | Jacobson et al. | |
| 6,045,955 A | 4/2000 | Vincent | |
| 6,515,790 B2 * | 2/2003 | Miyamoto et al. | 359/296 |
| 6,672,921 B1 | 1/2004 | Liang et al. | |
| 6,831,771 B2 | 12/2004 | Ho et al. | |
| 6,914,713 B2 | 7/2005 | Chung et al. | |
| 6,927,892 B2 | 8/2005 | Ho et al. | |
| 6,930,818 B1 | 8/2005 | Liang et al. | |
| 6,933,098 B2 | 8/2005 | Chan-Park et al. | |
| 7,113,323 B2 | 9/2006 | Ho et al. | |
| 7,142,351 B2 | 11/2006 | Chung et al. | |
| 7,245,414 B2 | 7/2007 | Liang et al. | |
| 7,576,904 B2 | 8/2009 | Chung et al. | |
| 7,580,180 B2 | 8/2009 | Ho et al. | |
| 2002/0171910 A1 | 11/2002 | Pullen et al. | |
| 2003/0007653 A1 | 1/2003 | Azima et al. | |
| 2003/0076573 A1 | 4/2003 | Gates et al. | |

FOREIGN PATENT DOCUMENTS

| | | |
|---|---|---|
| EP | 0 994 455 | 4/2000 |
| EP | 1 083 538 | 3/2001 |
| JP | 06-610341 | 3/1994 |
| JP | 10-044689 | 2/1998 |
| JP | 11-024113 | 1/1999 |
| JP | 2000-0122577 | 4/2000 |
| JP | 2000-0221547 | 8/2000 |
| JP | 2000-0221912 | 8/2000 |
| JP | 2000-0221913 | 8/2000 |
| JP | 2003-0305490 | 11/2000 |
| TW | 385281 | 3/2000 |
| TW | 451175 | 8/2001 |
| TW | 466186 | 12/2001 |
| WO | WO 01/67170 | 9/2001 |
| WO | WO 02/01281 | 1/2002 |
| WO | WO 02/65215 | 8/2002 |
| WO | WO 03/081325 | 10/2003 |

OTHER PUBLICATIONS

Bardsley, J.N. & Pinnel, M.R. (Nov. 2004) Microcup™ Electrophoretic Displays. *USDC Flexible Display Report*, 3.1.2., pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Applications and the Dynamics of Companies. *TRI.* 1-10. (In Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec.2003). *Microcup (R) Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hopper et al (1979) *IEEE Trans. Electr. Dev.*, 26 (8), 1148-1152.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kamachi, M. (1997) Magnet Polymers, *Functional Monomers and polymer*, Chapter 5, pp. 149-171, Marcel Dekker, Inc.

Lee, H., & Liang, R.C. (Jun. 2003) SiPix Microcup(R) Electronic Paper—An Introduction. *Advanced Display*, Issue 37, 4-9 (in Chinese, English abstract attached).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., & Tseng, S. (Feb. 2003). *Microcup(R) LCD, An New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology Expo & Conference.

Nikkei Microdevices. (Dec. 2002) Newly-Developed Color Electronic Paper Promises—Unbeatable Production Efficiency. *Nikkei Microdevices, 3.* (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, H.M.Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup®EPDs by Roll-to-Roll Manufacturing Process*. Presentation conducted at the Fourth Organic Electronics Conference and Exhibition (OEC-06), Sep. 25-27, 2006, Frankfurt, Germany.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

\* cited by examiner

MAGNETOPHORETIC AND ELECTROMAGNETOPHORETIC DISPLAYS

This application is a continuation of U.S. application Ser. No. 11/510,285, filed on Aug. 24, 2006 now U.S. Pat. No. 7,580,180, which is a continuation-in-part of U.S. application Ser. No. 11/149,678 filed on Jun. 8, 2005, now U.S. Pat. No. 7,113,323, which is a continuation-in-part of U.S. application Ser. No. 10/394,488, filed Mar. 20, 2003, now U.S. Pat. No. 6,927,892, which claims the benefit of U.S. Provisional Application 60/367,325, filed Mar. 21, 2002; the contents of all the applications referred to above are incorporated herein by reference in their entirety.

BACKGROUND OF THE INVENTION

An electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart plate-like electrodes, with spacers predetermining a certain distance between the electrodes. At least one of the electrodes, typically on the viewing side, is transparent.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time. EPDs of different pixel or cell structures have been reported previously, for example, the partition-type EPD (M. A. Hopper and V. Novotny, *IEEE Trans. Electr. Dev.*, 26(8):1148-1152 (1979)) and the microencapsulated EPD (U.S. Pat. Nos. 5,961,804 and 5,930,026).

An improved EPD technology was disclosed in U.S. Pat. Nos. 6,930,818 (corresponding to WO 01/67170 published on Sep. 13, 2001), 6,672,921 (corresponding to WO 02/65215 published on Aug. 22, 2002) and 6,933,098 (corresponding to WO 02/01281 published on Jan. 3, 2002), all of which are incorporated herein by reference. The improved EPD comprises isolated cells formed from microcups of well-defined shape, size and aspect ratio and filled with charged particles dispersed in a dielectric solvent or solvent mixture, preferably a halogenated solvent, particularly a perfluorinated solvent. The filled cells are individually sealed with a polymeric sealing layer, preferably formed from a composition comprising a material selected from the group consisting of thermoplastics, thermosets and precursors thereof.

All of the previously known and the microcup-based electrophoretic displays may be constructed into the form of a board to be used as e-signs or e-bulletins. However, the use of a transparent conductor film, such as indium tin oxide (ITO) on the viewing side, particularly a transparent patterned conductor film, in such large displays is an economic disadvantage as the transparent conductor film is expensive. The expense for the transparent conductor film often is a major part of the total manufacturing cost of the electrophoretic displays. In addition, the ITO film is brittle and only provides about 80-90% of transmission or reflection in the visible light region. Therefore, there is still a need for a solution to these issues.

SUMMARY OF THE INVENTION

The display of the present invention comprises two layers of insulating substrate, at least one of which, usually the one on the viewing side, is transparent, and an array of display cells sandwiched between the two layers of insulating substrate. The display may optionally comprise a conductive layer placed between the array of cells and one of the substrate layers.

In one embodiment, the insulating substrate layers are dielectric substrate layers.

The display cells are filled with an electromagnetophoretic fluid in which magnetic particles are dispersed in a liquid medium. The particles preferably are prepared from highly magnetic compounds and metals or alloys. The liquid medium may comprise a contrast colorant, which may be a dye or pigment. In one embodiment, the magnetic particles may be suspended in air.

In one embodiment of this invention, the magnetic particles are colored or blackened and the contrast color pigment in the liquid medium is white such as $TiO_2$ and $ZnO$. The magnetic particles or the white contrast pigment particles may be charged or non-charged. If both the magnetic particles and the white contrast particles are charged, they should either carry charges of opposite polarity or carry charge of the same polarity but different charge density so that enough discrimination of electrophoretic mobility between the two type particles exists.

In another embodiment of the invention, magnetic particles having a high surface reflectivity are dispersed in a liquid medium which further comprises a colorant of a contrast color. Metal and paramagnetic particles such as stainless steel, Fe—Co, Fe—Ni, Fe—Co—Ni, Ni—Co, Co—Cr or Fe—Co—V alloy particles are particularly useful in this case. The magnetic particles may be charged or non-charged. The colorant for generating color of the liquid medium may be a dye or a pigment which may also be charged or non-charged.

The device may further comprise a writing means, such as a magnetic pen, a magnetic writing head, a high voltage electric writing head or a high voltage pen, for generating an image. The writing means may be on the viewing side or behind the non-viewing side.

The device may also optionally comprise an erasing means to magnetically or electrically erase an image. The erasing means may also be placed on the viewing side or behind the non-viewing side.

Similar to conventional electrophoretic displays (EPDs or EPIDs), the electromagnetophoretic displays (EMPDs) of this invention are bistable and have a very wide viewing angle. Many different driving mechanisms and circuitry designs may be employed to achieve optimum performance of the displays of this invention. Most of them do not require the use of a transparent conductor film, such as ITO film, which is expensive, fragile and often transmits or reflects less than 90% of the incipient visible light. As a result, the displays of the invention are much more flexible and durable than conventional displays and provide images of a high contrast ratio, wide viewing angle and high reflectance in the Dmin area. Furthermore, the present invention provides a great number of alternatives in design, and a particular type of

DETAILED DESCRIPTION OF THE INVENTION

Figure 1:
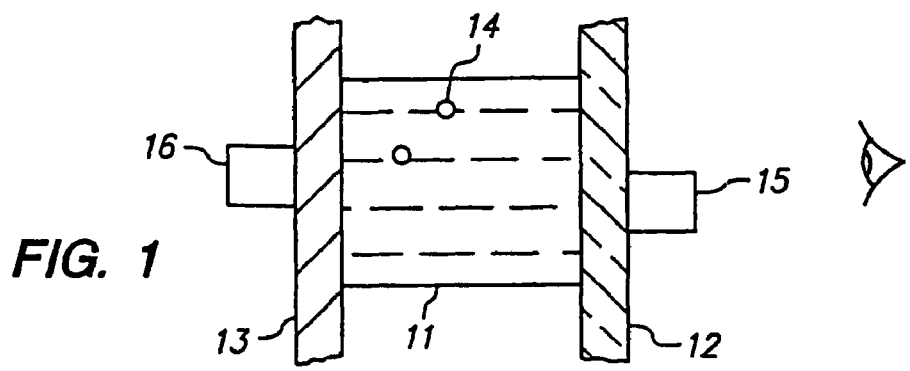
FIGS. 1-9 depict a variety of designs for the magnetophoretic and electromagnetophoretic display of the invention.

The present invention is directed to a display device, which comprises two layers of substrate, at least the viewing side is transparent, and an array of display cells sandwiched between the two layers of substrate. In the context of this application, the term "viewing side" refers to the side seen by the viewer whereas the term "non-viewing" side refers to the side opposite from the viewing side.

In one embodiment, the two substrate layers may be insulating or dielectric layers, such as microporous organosilicates, ceramic, aluminum oxide, titanium dioxide, glass and polymeric sheets, plates or films prepared from poly(ethylene terephthalate), poly(ethylene naphthalate), polycarbonate, polysulfone, polyimide, epoxy, phenolic, acrylics, unsaturated polyester, polyamide, polyurethane, polyurea and composites thereof. In the embodiments of this invention where an electric field is used to drive or erase an image, a conductive layer on the substrate is needed. Suitable conductive layers include Al, Cu, Au, Ag, Ni, Sn, ITO (Indium Tin Oxide) and alloys or composite films thereof.

The display cells sandwiched between the two layers of substrate may be the conventional type of display cells (e.g., the partition-type cells), the microcapsule-based cells (prepared according to U.S. Pat. Nos. 5,961,804 and 5,930,026) or the cells prepared according to the microcup technology disclosed in U.S. Pat. No. 6,930,818—and related applications.

The display cells are filled with a magnetophoretic or electromagnetophoretic fluid comprising magnetic particles dispersed in a liquid medium. The magnetic particles may be dispersed in the liquid medium by any of the well-known methods, including grinding, milling, attriting, microfluidizing and ultrasonic techniques. For example, magnetic particles in the form of a fine powder are added to the liquid medium and the resulting mixture is ball milled or attrited for several hours to break up the highly agglomerated dry pigment powder into primary particles.

Low vapor pressure, non-hygroscopic solvents or solvent mixtures may be used as the liquid medium. Examples of useful solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, low viscosity polyethers such as polypropylene glycols and block copolymers of ethylene glycol and propylene glycol, low viscosity silicone oils, alkyl or alkylaryl esters and ketones, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane and pentachlorobenzene, perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene)s such as Halocarbon Oils from Halocarbon Product Corp., River Edge, N.J. and perfluoropolyalkylether such as Galden from Ausimont or Krytox Oils and Greases K-Fluid Series from DuPont, Del. In one embodiment, poly(chlorotrifluoroethylene) may be used as the liquid medium. In another embodiment, poly(perfluoropropylene oxide) may be used as the liquid medium.

Sedimentation or creaming of the pigment particles may be eliminated by microencapsulating the particles with suitable polymers to match the specific gravity to that of the liquid medium. Microencapsulation of the pigment particles may be accomplished chemically or physically. Typical microencapsulation processes may include interfacial polymerization, in-situ polymerization, phase separation, coacervation, electrostatic coating, spray drying, fluidized bed coating and solvent evaporation. Well-known procedures for microencapsulation have been disclosed in Kondo, Microcapsule Processing and Technology, Microencapsulation, Processes and Applications, (I.E. Vandegaer, ed.), Plenum Press, New York, N.Y. (1974), and in Gutcho, Microcapsules and Microencapsulation Techniques, Noyes Data Corp., Park Ridge, N.J. (1976), both of which are hereby incorporated by reference.

In addition to solvents or solvent mixtures, the term "liquid medium", in the context of this invention, may include other substances that have a tendency to flow, such as melted wax. After being filled into the display cells, the liquid medium may change its physical state temporarily or permanently (i.e., turned into a solid, semi-solid or elastic state).

The magnetic or electromagnetic particles may also be suspended in air in the form of free flowing power.

Magnetic particles prepared from highly magnetic compounds and metals or alloys are preferred. Examples of magnetic materials useful in this invention include gamma ferric oxide, acicular magnetite, cobalt-modified or adsorbed ferric oxide, berthollide ferric oxide, chromium dioxide, metals or alloys (such as stainless steel, Fe—Co, Fe—Ni, Fe—Co—Ni, Co—Ni, Co—Cr and Fe—Co—V alloys), organic polyradicals (such as polymers with organic radicals in the side chain, main-chain conjugated polymers with organic radicals, two dimensional polyradicals, polymers containing paramagnetic metalloporphyrins as side chains and polymers containing paramagnetic metal ions, e.g., Cu(II), Ni(II), Mn(II) or VO(II), in the main chain). Other useful magnetic materials can be found in references such as "Magnetic Recording Handbook" by Marvin Camras; Van Norstrand Reinhold Co., (1988); and M. Kamachi "Magnetic Polymers" in "Functional Monomers and Polymers", ed. By K. Takemoto, R. M. Ottenbrite and M. Kamachi; Marcel Dekker, Inc., (1997), the contents of which are incorporated herein by reference.

Specific examples of organic polyradicals include, but not limited to, those shown in the references identified above and several US patents (e.g., U.S. Pat. Nos. 4,631,328, 4,594,400, 4,552,928 and 4,769,443), the contents of which are incorporated herein by reference. Organic polyradicals shown by Kamachi in "Magnetic Polymers" may include those containing 2,2,6,6-tetramethylpiperidine-1-oxyl as a side chain, thermally annealed polyphenylacetylene, those with phenoxy or nitroxy radicals, poly(1,3-phenyleneethynylene) with pendant nitronyl nitroxide or t-butylnitroxyl, two-dimensional polymers, such as that obtained by reacting 1,3,5-triaminobenzene with iodine, those with a repeating unit derived from indigo, those obtained from the catalyst-free 1,3-dipolar cycloaddition of 1,3-bis-(3-sydnone) and N',N'-(1,4-phenylene)bismaleamide, those containing paramagnetic ions either in the side chain or in the main chain. Those containing paramagnetic ions in the side chain include compounds containing tetraphenylporphyrin (TPP) moieties, especially those derived from paramagnetic metal ions, for example, Cu(II), Ag(II), VO(II) and Co(II), and that derived from the reaction of TPP—Mn(II) and tetracyanoethylene in toluene. Those containing paramagnetic ions in the main chain include a heterobinuclear complex of Cu(II) and VO(II), an inorganic polymer, $MnCu(pbaOH)(H_2O)_3$ with regularly alternating magnetic centers, where pbaOH is 2-hydroxy-1, 3-propylenebis(oxamato), polymers composed of 2-substituted 4,4,5,5-tetramethylimidazoline-1-oxyl-3-oxide and derived from Cu(II), Ni(II) or Mn(II), linear chain polymers of $M(hfac)_2(NIT)R$ where M is Cu(II), Ni(II) or Mn(II), (NIT)R is 2-alkyl-4,4,5,5-tetramethylimidazoline-1-oxyl-3-oxide and hfac is hexafluoroaceteylacetonate, and three dimensional structures, such as $(rad)_2Mn_2[Cu(opba)]_3$ $(DMSO)_2:2H_2O$, where rad is 2-(4-N-methylpyridinium)-4, 4,5,5-tetramethylimidazoline-1-oxyl-3-oxide, opba is o-phenylenebis(oxamato) and DMSO is dimethyl sulfoxide. Other polymeric radical containing compounds, (with the identity of the radical and its location indicated in the parentheses), are those described in U.S. Pat. Nos. 4,631,328 (various anthraquinone, stilbene, mono-, bis- or tris-azo dyes, side chain), 4,594,400 (thioxanthone, side chain), 4,552,928 (di- and triphenylamine, side chain) and 4,769,443 (piperidine, side chain). Some of these organic polyradicals may be prepared by including radical precursors in the prepolymer mixture, effecting polymerization and then conversion to the radicals.

In one embodiment of this invention, contrast colorant particles are magnetized by coating the colorant particles (e.g., $TiO_2$, ZnO, or organic pigments such as carbon black, phthalocyanine and other organic pigments) with a magnetic material by, for example, sputtering, vacuum deposition, electrodeposition, electroplating or electroless plating.

In another embodiment of this invention, the colorant pigment particles are microencapsulated in a polymer matrix and the magnetic particles are mixed with the colorant pigment particles before the microencapsulation process. Submicron magnetic or metal particles are the most preferred in this case.

In a further embodiment of this invention, the colorant particles are magnetized by coating or encapsulating the particles with an organic polyradical or magnetic polymer mentioned above.

The magnetized particles may be charged or non-charged. Similarly, the contrast colorant particles may also be charged or non-charged. For the charged particles, they may exhibit a native charge, or may be charged explicitly using a charge control agent, or may acquire a charge when suspended in the suspending medium. Suitable charge controlling agents are well known in the art; they may be polymeric or non-polymeric in nature, and may also be ionic or non-ionic. Particles having high image bistability, low viscosity, and high dispersion stability against sedimentation, creaming, flocculation and network formation are preferred.

For simplicity, colors of white or black are used to illustrate the figures in the following. However, the colors may also be referred to as "a first color" or "a second color" and the two colors may be contrasting colors.

FIG. 1 depicts a magnetophoretic display of the present invention. A display cell (11) is sandwiched between two layers of substrate (12 and 13). At least one of the two layers is transparent and the transparent layer (12) is on the viewing side. The cell is filled with a reflective or white (the primary color), non-charged magnetic particles (14) dispersed in a clear (contrast) color solution. Useful magnetic particles for this case include metal particles or metallized particles prepared by, for example, sputtering, vacuum deposition, electrodeposition, electroplating, electroless plating, magnetic polymer coated or microencapsulated white pigments particles such as $TiO_2$ and ZnO, and microcapsules containing a mixture of white pigments and magnetic particles, particularly metal particles. Dyes or colorant pigments having a particles size well below the visible light scattering range (0.2-0.4 micrometer) are useful for preparing the clear contrast color solution.

Initially by applying a magnetic eraser (15) placed on the viewing side (12) of the display, all the reflective or white (primary color) magnetic particles are attracted to the viewing side, resulting in the color of the particles as the background seen by the viewer. A magnetic writing head (16), in this design, is placed behind the non-viewing side (13). The writing head is controlled by a PC or a tablet (not shown). When the writing head is turned on, the white particles are attracted to the non-viewing side. For the areas where the white or reflective particles are on the non-viewing side, the color of the dispersion medium (i.e., the contrast color) is seen from the viewing side, thus creating a contrast color-on-white or contrast-on-primary color image.

Figure 2:
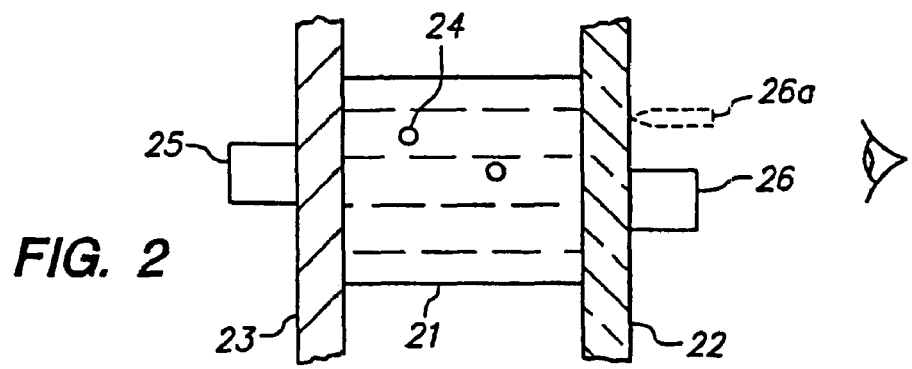

FIG. 2 illustrates an alternative embodiment of the invention in which the cell is also filled with non-charged, reflective or white (primary color) magnetic particles (24) dispersed in a clear contrast color solution. In this design, a magnetic eraser device (25) is placed behind the non-viewing side (23). Initially the eraser attracts the white or reflective magnetic particles to the non-viewing side which generates a contrast background color (i.e., the color of the dispersion medium) seen from the viewing side. In this design, the image may be created by a magnetic writing device or writer (26) placed on the viewing side. When the writer (26) is turned on and the eraser (25) is turned off, the white or reflective magnetic particles are attracted to the viewing side, thus generating a white-on-contrast color or primary-on-contrast color image. Alternatively, a magnetic pen (26a, on the viewing side) may be used instead of the magnetic writing head (26) to create the same image discrimination.

Figure 3A:
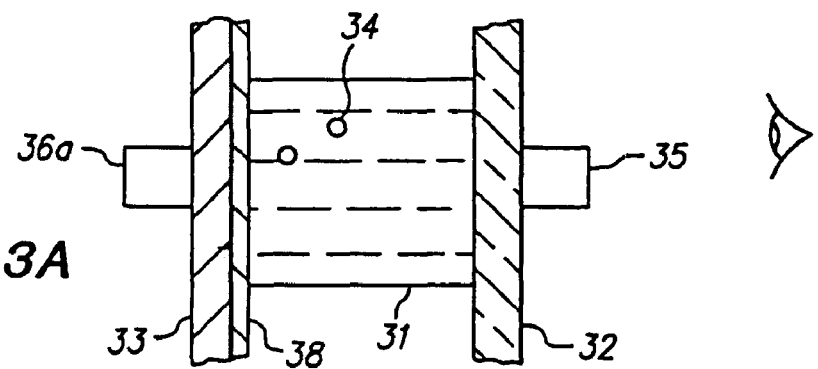
Figure 3B:
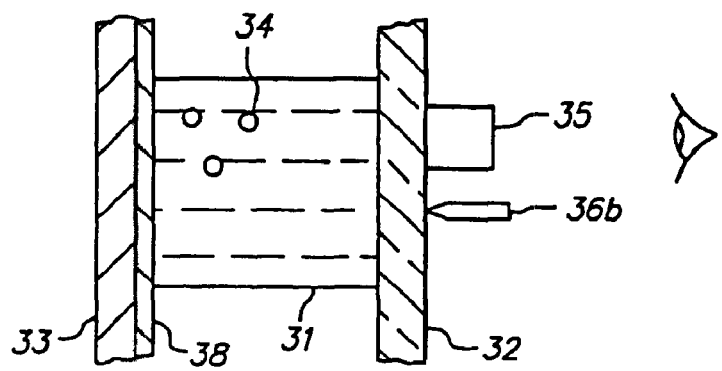

FIG. 3 illustrates another alternative embodiment in which the cell is filled with charged, white (primary color) or reflective magnetic particles (34) dispersed in a clear solvent of a contrast color. A display cell (31) is sandwiched between two layers of substrate (32 and 33). At least one of the two layers is transparent and the transparent layer (32) is on the viewing side. However, in this case, a layer of conductor film (38) is placed between the cell (31) and the layer of substrate (33) on the non-viewing side. A magnetic eraser (35) is placed on the viewing side. By applying the magnetic erasing means, the white or reflective magnetic particles are attracted to the viewing side thus generating a white or primary color background. In this design, an image may be created by either a magnetic writing head (36a) placed behind the non-viewing side (FIG. 3A) or a high voltage electric writing head (not shown in FIG. 3B) or a high voltage electric pen (36b) on the viewing side (FIG. 3B). In the first scenario, when the magnetic writing head is applied, it attracts the white (primary color) particles to the non-viewing side thus creating a contrast color-on-white (or on primary color) image. In the second scenario when a high voltage electric writing head or electric pen is used, an image may be created by applying appropriate voltages to the electric pen and the conductor film layer (38). For example, if the conductor film has polarity opposite from the particles and the electric writing head or pen has the same polarity as the particles, the white or primary color particles inevitably migrate to the non-viewing side thus also generating a contrast color-on-white (or primary color) image. This embodiment is one of the preferred.

There are still further embodiments of the present invention in which a mixture of black or colored magnetic particles and white, non-magnetic particles are dispersed in a colorless clear solvent. The particles may be charged or non-charged. If both types of particles are charged, it is preferable to have the same polarity. These designs are illustrated below.

Figure 4:
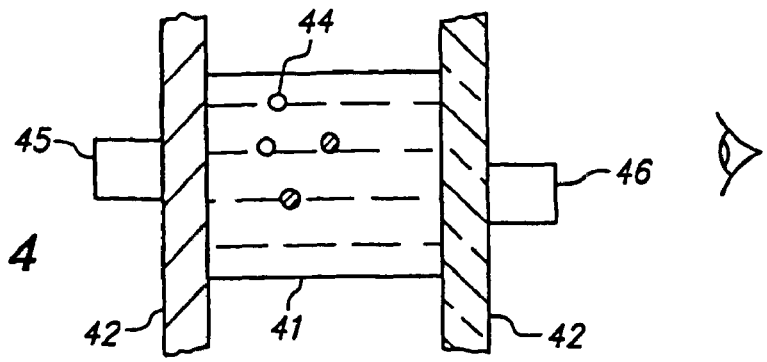

In the design as illustrated in FIG. 4, both types of particles are non-charged. The design does not comprise a conductive film layer. A magnetic eraser (45) is placed behind the non-viewing side. When the eraser head is applied, the black or color magnetic particles are attracted to the non-viewing side while the white non-magnetic particles are randomly dispersed in the dispersion medium, thus creating a white background color. The writing means (46) in this design is placed on the viewing side and the writing means may be either a magnetic writing head or a magnetic pen. When the magnetic writing head or the magnetic pen is turned on, the black or color magnetic particles are attracted to the viewing side thus generating a black (contrast color)-on-white image. This is also one of the preferred embodiments.

Figure 5:
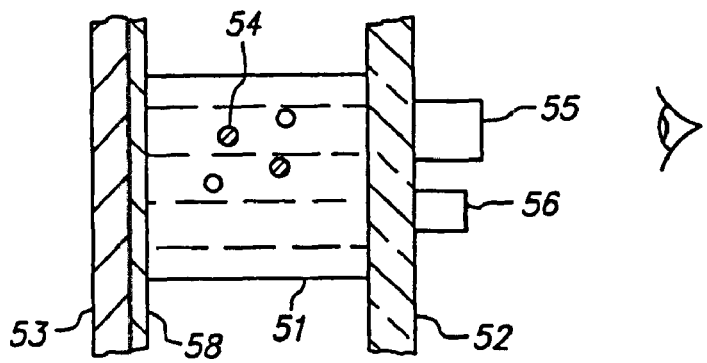

FIG. 5 illustrates an embodiment of the present invention in which a mixture of charged, black or color magnetic particles and charged, white non-magnetic particles are dispersed in a colorless clear solvent. This design also comprises a conductive film layer (58). In this case, an electric erasing means (55) is placed on the viewing side and it may be a high voltage electric eraser head or a manual high voltage electric eraser. The white and black particles may carry opposite charge polarity or the same polarity. If they are of the same polarity, the two types of particles should have enough difference in electrophoretic mobility for image discrimination. The conductive film layer (58) has polarity opposite from the black particles and the electric erasing means has the same polarity as the black particles. As a result, the black or color magnetic particles migrate to the non-viewing side because of the electric force and the white particles either migrate to the viewing side or, to a large degree, remain randomly dispersed in the dispersion medium, thus creating a white background. The white background may also be achieved by applying a magnetic erasing means from the non-viewing side. The writing means (56) in this embodiment is also on the viewing side and it may be either a magnetic writing head or a magnetic pen. When the magnetic writing means is applied, it attracts the black magnetic particles to the viewing side thus generating a black (contrast color)-on-white image.

Figure 6:
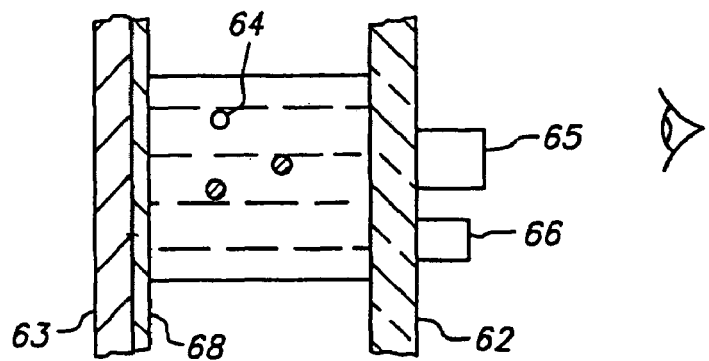

Alternatively, the display may have a mixture of charged, black or contrast color magnetic particles and non-charged, white non-magnetic particles dispersed in a colorless clear solvent, as shown in FIG. 6. When an electric erasing means (65) is applied from the viewing side (provided that the conductive film layer has a charge polarity opposite to that of the black or color particles and the electric erasing means has the same polarity), only the black or color particles migrate to the non-viewing side and the white particles are randomly dispersed in the dispersion medium, generating a white background color seen from the viewing side. The white background may also be achieved by applying a magnetic erasing means from the non-viewing side. The writing means (66) in this design is also on the viewing side and it may be a magnetic writing head, a magnetic pen, a high voltage electric writing head or a high-voltage writing pen. As shown in FIG. 6, when the magnetic writing means is applied, it attracts the black or contrast color magnetic particles to the viewing side thus generating a black (contrast color)-on-white image. When an electric writing means having the opposite polarity from the black particles is applied, the writing means attracts the black particles to the viewing side, thus also generating a black (contrast color)-on-white image.

Figure 7:
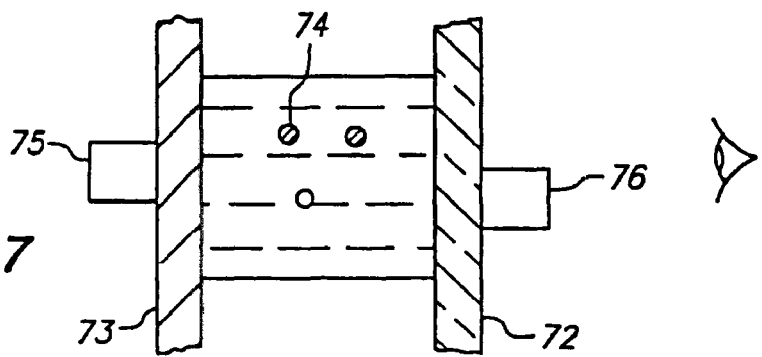

FIG. 7 illustrates another embodiment of the present invention. This design employs a mixture of non-charged, white or reflective magnetic particles and non-charged, contrast color or black non-magnetic particles dispersed in a colorless clear solvent. The design does not comprise a conductive film layer. A magnetic eraser head (75) is placed behind the non-viewing side. When the eraser head is applied, the white magnetic particles are attracted to the non-viewing side while the black or color non-magnetic particles are randomly dispersed in the dispersion medium, thus creating a black or contrast color background. The writing means (76) in this design is placed on the viewing side and the writing means may be either a magnetic writing head or a magnetic pen. When the magnetic writing head or the magnetic pen is turned on, the white or reflective magnetic particles are attracted to the viewing side thus generating a white (reflective)-on-black (contrast color) image.

Figure 8:
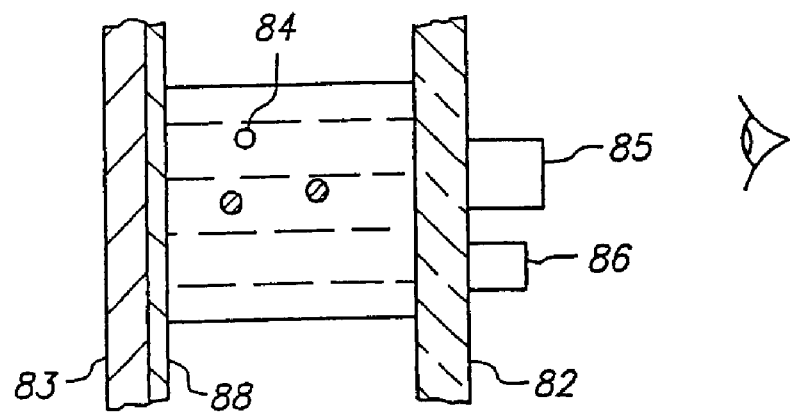

FIG. 8 illustrates a further embodiment of the present invention. In this embodiment, a mixture of charged, white or reflective magnetic particles and charged, black or contrast color non-magnetic particles are dispersed in a colorless clear solvent. The design also comprises a conductive film layer (88). In this case, the erasing means (85) is placed on the viewing side and it may be a high voltage electric eraser head, a manual high voltage electric eraser, a magnetic eraser head or a manual eraser head. In one scenario, the two types of particles may carry opposite charges, the conductive film layer has same polarity as the white or reflective magnetic particles and the electric erasing means has the opposite polarity. In other words, the conductive film layer has polarity opposite of the black or color non-magnetic particles and the electric erasing means has the same polarity as the black non-magnetic particles. As a result, the white or reflective particles migrate to the viewing side by the electric force creating a white or reflective background color. In another scenario, the white or reflective background color may also be created by a magnetic erasing means placed on the viewing side. The writing means (86) in this embodiment is also on the viewing side and it may be either a high voltage writing head or a high voltage pen. When the electric writing means is applied, it attracts the black or contrast color non-magnetic particles to the viewing side (provided that the electric writing means has the same polarity as the white or reflective magnetic particles; but opposite polarity to the black or color non-magnetic particles), thus generating a black (contrast color)-on-white (reflective) image. This is also one of the preferred embodiments.

Figure 9:
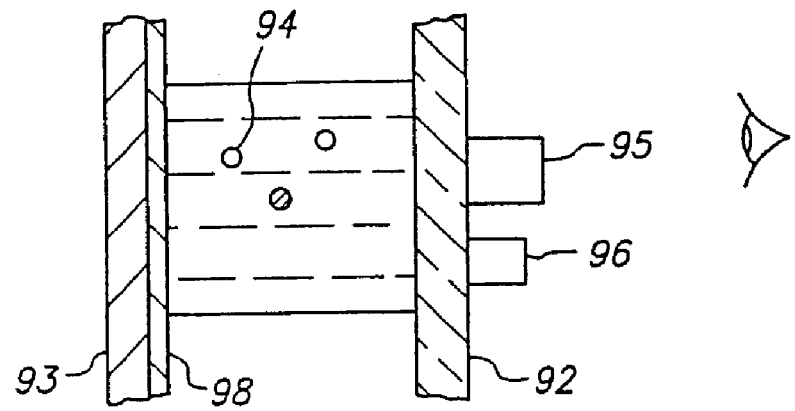

Alternatively, the black or contrast color non-magnetic particles in this design are non-charged or carry a charge of the same polarity as the magnetic particles, but with a significantly lower electrophoretic mobility. As a result, in the scenario illustrated in FIG. 9, when an electric erasing mean (95) is applied from the viewing side (provided that the conductive film layer has opposite polarity as the white or reflective magnetic particles and the electric erasing means has the same polarity), only the white or reflective particles migrate to the non-viewing side and the black or contrast color particles remain randomly dispersed in the dispersion medium, generating a black or contrast color background seen from the viewing side. The black or contrast color background may also be achieved by applying a magnetic erasing means from the non-viewing side. The writing means (96) in this embodiment is also on the viewing side and it may be a magnetic writing head, a magnetic pen, a high voltage electric writing head, or a high-voltage writing pen. As shown in FIG. 9, when the magnetic writing means is applied, it attracts the white or reflective particles (which are magnetic) to the viewing side thus generating a white (reflective)-on-black (contrast color) image. When an electric writing means is applied, the white or reflective particles may also be attracted to the viewing side generating a white (reflective)-on-black (contrast color) image.

Figure 10:
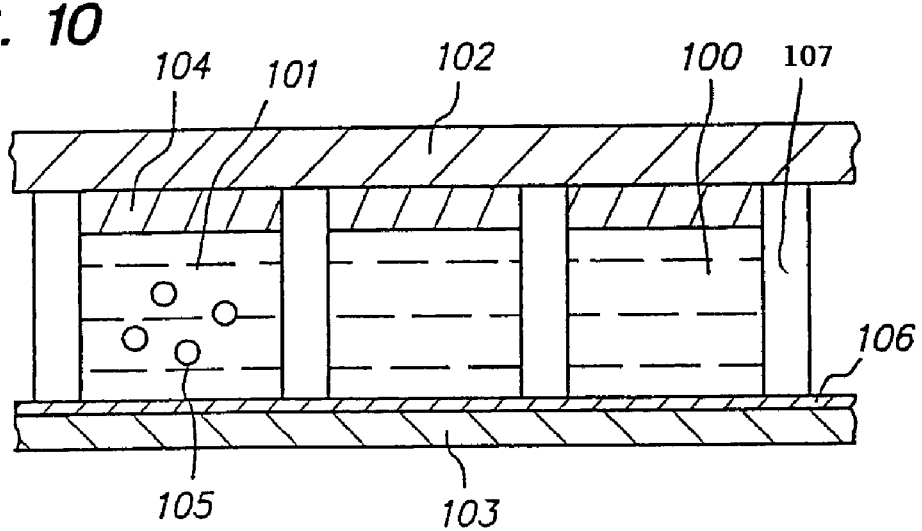
FIG. 10 depicts a preferred embodiment of the present invention in which the cells are individually sealed.

FIG. 10 depicts a preferred embodiment of the present invention. The cells (100) are sandwiched between the two layers of substrate (102 and 103) and of well-defined size, shape and aspect ratio and are individually sealed with a polymeric sealing layer (104). The cells have partition walls (107) which separate the electromagnetophoretic fluid (101). The display may optionally comprise an additional adhesive layer (not shown) between the substrate (102) and the polymeric sealing layer (104). The particles (105) suspended in the electromagnetophoretic fluid (101) are magnetized and optionally charged. The electromagnetophoretic display (EMPD) of this invention may further comprise a polymeric layer (not shown) between the substrate (103) and the electromagnetophoretic fluid (101). The "microcup" based cells may be prepared by a microembossing process or by photolithography as described in WO01/67170 and related applications. There may be a conductor film layer (106) optionally placed between the cells (100) and one of the two substrate layers (102 & 103). The device as described has a recording means and optionally an erasing means as depicted in FIGS. 1-9.

The formation of the sealing layer (104) is carried out by any of the methods disclosed in U.S. Pat. No. 6,930,818, the content of which is incorporated herein by reference in its entirety. Briefly, the microcup-based cells filled with an electromagnetophoretic fluid are sealed with a polymeric sealing layer. The polymeric sealing layer may be formed from a sealing composition having a specific gravity preferably lower than that of the electromagnetophoretic fluid. In one method, the sealing is accomplished by dispersing the sealing composition into the electromagnetophoretic fluid before filling and after filling, the sealing composition forms a supernatant layer on top of the electromagnetophoretic fluid, after which, the polymeric sealing layer is hardened by solvent evaporation, interfacial reaction, moisture, heat or radiation. In another method, the sealing is accomplished by overcoating the electromagnetophoretic fluid with the sealing composition and the sealing is then accomplished by hardening the sealing composition by solvent evaporation, interfacial reaction, moisture, heat, radiation or a combination of these curing mechanisms. In both methods, the polymeric sealing layer is hardened in situ (i.e., when the sealing composition is in contact with the electromagnetophoretic fluid).

The embodiments specifically exemplified above are clearly not exhaustive. It should be understood that various magnetophoresis and electro-magnetophoresis may be constructed by varying the following elements:

1) magnetic particles of one single color which may be
  i) charged; or
  ii) non-charged;
2) two types of color (primary color and contrast color) particles, one of which is magnetic and
  a) both types of particles are non-charged;
  b) only one of them is charged;
  c) both are charged; but carrying opposite charges
  d) both carry charges of the same polarity but one of them has a significantly higher electrophoretic mobility than the other.
3) color of the solvent in which the particles are dispersed;
4) an electric erasing means or magnetic erasing means
5) the erasing means may be on the viewing or non-viewing side
6) an electric writing means or a magnetic writing means
7) the writing means may be on the viewing or non-viewing side.

For example, the magnetic particles may comprise white magnetic particles and magnetic particles of a contrast color. The two types of magnetic particles may be suspended in a clear and colorless liquid medium or in air. In one embodiment, the white magnetic particles are charged and the magnetic particles of the contrast color are non-charged. In another embodiment, the white magnetic particles are non-charged and the magnetic particles of the contrast color are charged. In a further embodiment, the magnetic particles are white and the dispersion further comprises charged non-magnetic particles of a contrast color. In still a further embodiment, the white magnetic particles are charged. In still a further embodiment, the white magnetic particles are non-charged.

It is also possible that the magnetic particles in the dispersion comprise black magnetic particles and magnetic particles of a contrast color. The two types of magnetic particles are suspended in a clear and colorless liquid medium or in air. In one embodiment, the black magnetic particles are charged and the magnetic particles of the contrast color are non-charged. In another embodiment, the black magnetic particles are non-charged and the magnetic particles of the contrast color are charged. In a further embodiment, the magnetic particles are black and the dispersion further comprises charged non-magnetic particles of a contrast color. In still a further embodiment, the black magnetic particles are charged. In still a further embodiment, the black magnetic particles are non-charged.

When two types of magnetic particles are present in the dispersion, it is preferred that the two types of magnetic particles have different mobility. For example, the magnetic particles may be "paramagnetic", "ferrimagnetic", "ferromagnetic" and "diamagnetic". The first three may be attracted to a magnet with increasing positive susceptibility and the diamagnetic may be repelled (negative susceptibility). In other words, if both types of particles are magnetic, it is preferred that the magnetic particles have different susceptibility between the two types to show differentiation in mobility in the magnetic field.

In this invention, when referring to particles of a particular color (e.g., white, black or "a first color", etc.), it means that predominantly the particles are of that color. It is also noted that a particular color may be achieved by mixing particles of different colors. For example, a black color may be achieved by a mixture of particles of red, green and blue colors in various proportions.

The various combinations of the elements are intended to be within the scope of the claims appended hereto.

What is claimed is:

1. An image display comprising display cells filled with a dispersion, the dispersion comprises particles suspended in a solvent or solvent mixture, wherein said particles are formed from a material selected from the group consisting of gamma ferric oxide, acicular magnetite, cobalt-modified or adsorbed ferric oxide, berthollide ferric oxide, chromium dioxide, metals, alloys, and organic polyradicals.

2. The display of claim 1, further comprising a writing means.

3. The display of claim 2, further comprises an erasing means.

4. The display of claim 1, wherein said particles are paramagnetic, ferromagnetic, antiferromagnetic, or ferrimagnetic particles.

5. The display of claim 1, wherein said metal or alloy is stainless steel, Fe—Co, Fe—Ni, Fe—Co—Ni, Co—Ni, Co—Cr, or Fe—Co—V alloy.

6. The display of claim 1, wherein said organic polyradical is selected from the group consisting of polymers with organic radicals in the side chain, main-chain conjugated polymers with organic radicals, two dimensional polyradicals, polymers containing paramagnetic metalloporphyrins as side chains, and polymers containing paramagnetic metal ions in the main chain.

7. The display of claim 6, wherein said paramagnetic metal ion is Cu(II), Ni(II), Mn(II), or VO(II).

8. The display of claim 1, wherein said particles are magnetized by overcoating or microencapsulating with a magnetic shell.

9. The display of claim 8, wherein said magnetic shell is formed from a material selected from the group consisting of gamma ferric oxide, acicular magnetite, cobalt-modified or adsorbed ferric oxide, berthollide ferric oxide, chromium dioxide, metals, alloys, and organic polyradicals.

10. The display of claim 9, wherein said organic polyradical is selected from the group consisting of polymers with organic radicals in the side chain, main-chain conjugated polymers with organic radicals, two dimensional polyradicals, polymers containing paramagnetic metalloporphyrins as side chains, and polymers containing paramagnetic metal ions in the main chain.

11. The display of claim 9, wherein said metal or said alloy is selected from the group consisting of Ni, Cu, Co, Fe, Cr, Fe—Co, Fe—Ni, Fe—Co—Ni, Co—Ni, Co—Cr, and Fe—Co—V alloys.

12. The display of claim 8, wherein said magnetic shell is a magnetic polymer shell coated onto the particles by a microencapsulation processes.

13. The display of claim 12, wherein said magnetic polymer shell is formed of a polymer selected from the group consisting of polymers with organic radicals in the side chain, main-chain conjugated polymers with organic radicals, two dimensional polyradicals, polymers containing paramagnetic metalloporphyrins as side chains, and polymers containing paramagnetic metal ions in the main chain.

14. The display of claim 13, wherein said paramagnetic metal ion is Cu(II), Ni(II), Mn(II), or VO(II).

15. The display of claim 1, wherein said particles are microcapsules containing a magnetic material dispersed in a polymeric matrix.

16. The display of claim 15, wherein said microcapsules further comprise a pigment or dye.

17. The display of claim 1, wherein said display cells are the microencapsulated cells.

18. The display of claim 1, wherein said display cells are the microcup cells.

* * * * *